(12) United States Patent
Maddali et al.

(10) Patent No.: US 6,381,127 B1
(45) Date of Patent: Apr. 30, 2002

(54) COMPUTER SUPPORT

(76) Inventors: Hari K. Maddali; Meena Maddali, both of 12173 Village Woods Dr., Cincinnati, OH (US) 45241-6069

( * ) Notice: Subject to any disclaimer, the term of this patent is extended or adjusted under 35 U.S.C. 154(b) by 99 days.

(21) Appl. No.: 09/597,432

(22) Filed: Jun. 20, 2000

(51) Int. Cl.[7] .................................................. H05K 7/14
(52) U.S. Cl. ........................ 361/683; 361/680; 361/681; 224/257-259; 224/270; 224/607; 224/616; D14/106; D3/215; D3/276; D3/287; D3/292
(58) Field of Search ................................. 361/683, 680, 361/681, 686; 224/257, 258, 259, 270, 607, 608, 610, 615, 616, 578; 364/708.1; 108/43; 206/320; D14/106; D3/276, 287, 292, 215, 304, 274, 303, 218

(56) References Cited

U.S. PATENT DOCUMENTS

| | | | | |
|---|---|---|---|---|
| 5,639,004 A | * | 6/1997 | Carlton et al. | 224/579 |
| 5,667,114 A | * | 9/1997 | Bourque | 224/270 |
| 5,724,225 A | | 3/1998 | Hrusoff et al. | 361/683 |
| 5,774,338 A | * | 6/1998 | Wessling, III | 361/730 |
| 5,887,777 A | | 3/1999 | Myles et al. | 224/578 |
| 5,938,096 A | * | 8/1999 | Sauer et al. | 224/625 |
| 6,006,970 A | * | 12/1999 | Piatt | 224/257 |

* cited by examiner

Primary Examiner—Darren Schuberg
Assistant Examiner—David Foster
(74) Attorney, Agent, or Firm—Wood, Herron & Evans, L.L.P.

(57) ABSTRACT

The present invention provides a laptop computer support having a generally planar support base with shoulder straps attached to a leading edge of the support base and back straps attached to a trailing edge of the support base. The shoulder and back straps converge at a strap junction overlaying the user's back when the computer support is in use. The laptop computer support affords virtually unrestricted access to at least three sides of the laptop computer base wherein hardware/software ports are conventionally located, and the shoulder and back straps are advantageously configured so as to distribute the weight of a laptop computer evenly across the user's shoulders and back. The laptop computer is variably fixed to the support base with a hook and loop type fastener.

21 Claims, 3 Drawing Sheets

COMPUTER SUPPORT

FIELD OF THE INVENTION

This invention relates to computer supports. More particularly, this invention relates to personal portable computer supports.

BACKGROUND OF THE INVENTION

Conventional laptop, or portable computer supports have certain drawbacks that limit their functionality and, further, may cause particular stress related injuries to a user. One such computer support is seen in U.S. Pat. No. 5,724,225, issued to Hrusoff et al. As can be seen in the Hrusoff patent, a portable computer carried in the support is limited in its functionality since the sidewalls have restricted access to conventionally located hardware and software portable computer ports that a user may desire to access during, for example, a stand up sales presentation or when using a computer for field work. Also, the Hrusoff support uses a shoulder/neck strap which forces the user to bear the weight of the portable computer across the upper shoulders and lower neck region which may lead to stress related injuries. Also, the shoulder/neck strap limits a user's freedom of movement in that a portion of the strap attaches vertically to the edge of the support closest to the user's body, thereby restricting lateral arm movement.

Miles et al., U.S. Pat. No. 5,887,777 discloses a computer carrying case that simply unzips in such a matter so as to afford a user access to the computer while the computer remains in the case. The Miles carrying bag does not allow a user to stand erect and be mobile while using the portable computer.

Other conventional personal portable computer stands simply unfold and stand erect on the floor as a portable computer is placed on the stand's platform. These stands are stationary and not intended to allow a user to be mobile when performing a sales presentation, for example. Furthermore, conventional unfolding portable computer stands are simply another piece of equipment that the user must carry from location to location until the user desires to assemble the stand and place the portable computer thereon.

OBJECTIVES OF THE INVENTION

Therefore, it has been an objective of the present invention to provide a portable computer support that more evenly distributes the weight of a portable computer over a user's shoulders and back.

It has been a further objective of the present invention to provide a portable computer support which allows a user to retain access to conventionally located hardware and software ports on at least three sides of the portable computer.

It has been another objective of the present invention to provide a convenient and easy to use portable computer support that a user may wear over the user's shoulders and across the user's back so that a user may stand erect and be mobile while using a portable computer.

It has been yet another objective of the present invention to provide a less bulky and easy to store portable computer support that insulates a user's lap from heat generated by the computer.

It has been another objective of the present invention to provide a portable computer support which allows a user to quickly and easily connect and disconnect the computer support from around the user's body.

SUMMARY OF THE INVENTION

The objectives of the present invention are accomplished by a laptop, or portable computer support in one presently preferred embodiment with a generally planar support base upon which a portable computer is located. The portable computer can be variably fixed to the support base with a hook and loop type fastener. The support base has opposed leading and trailing edges and opposed side edges. The edges combine to define a support base area which accommodates virtually all portable computers. The support base is attached with quick connect/disconnect buckles to shoulder straps near the support base's leading edge, and back straps attached near the support base's trailing edge. Each of the shoulder straps and back straps are adjustable in length so that a user may achieve the proper fit of the computer support when worn by the user.

The shoulders straps are attached with elastic straps to the opposed side edges proximate the leading edge. A living hinge is provided inboard of the elastic strap's attachment to the opposed side edges parallel to the leading edge and has a longitudinal dimension substantially equal to the width of the support base. When the computer support is in use and the support base is bearing the weight of a portable computer, the elastic straps upwardly bias a lip portion proximate the leading edge to help prevent the portable computer from accidentally becoming dislodged and falling over the support base leading edge.

The back straps are attached to the support base's second surface with hip straps that are so stitched to the second surface that when extended, define an angle in the range of about 30°–35° with respect to the support base trailing edge.

The back straps and shoulder straps converge at a strap junction which rests on the user's back when the computer support is in use. The computer support advantageously distributes the weight of the portable computer across the user's shoulders and across a large area of the user's back by converging the shoulder straps and back straps at the strap junction.

The planar support base provides access to a computer's forward face and opposed side faces where hardware and software ports are conventionally located so that a user may have access to these ports during a standup presentation or at any other time. In addition, because of the computer support's slim profile, the computer support may be left attached to the computer when the computer is stored in a conventional carrying case. Despite the support's slim profile, it still affords a user insulation from heat generated by the computer when on a user's lap. The slim profile allows the user to use the computer support with the computer attached thereto virtually anywhere, including at the beach, in a park, and in airline seats, while the user in a sitting or standing position and providing the user with a full and unobstructed view of the computer's flip-up monitor.

The computer support has a pair of utility flaps which hang from the support base on either side thereof and are attached thereto with a hook and loop-type fastener. The utility flaps have pockets in which items such as writing instruments or diskettes may be advantageously stored. When the portable computer is not in use, the utility flaps may be folded over the computer and joined to each other, providing a protective pocket in which the computer may be kept and in which the shoulder and back straps may be stored.

The features and objectives of the present-inventive portable computer support will become more readily apparent from the following Detailed Description taken in conjunction with the accompanying drawings.

DETAILED DESCRIPTION OF THE PREFERRED EMBODIMENT

Figure 1:
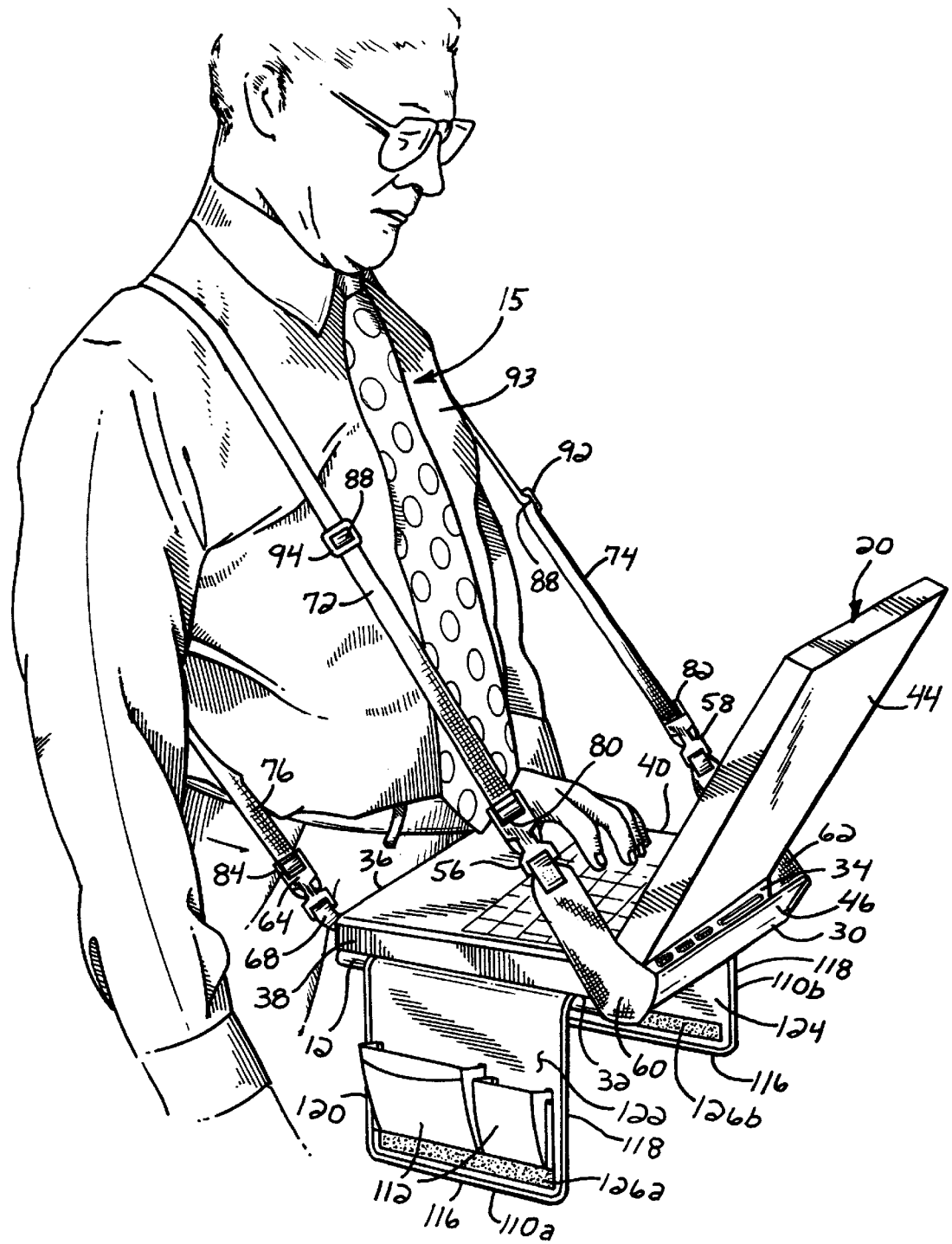
FIG. 1 is a first perspective view of the portable computer support of the present invention during use.
Figure 2:
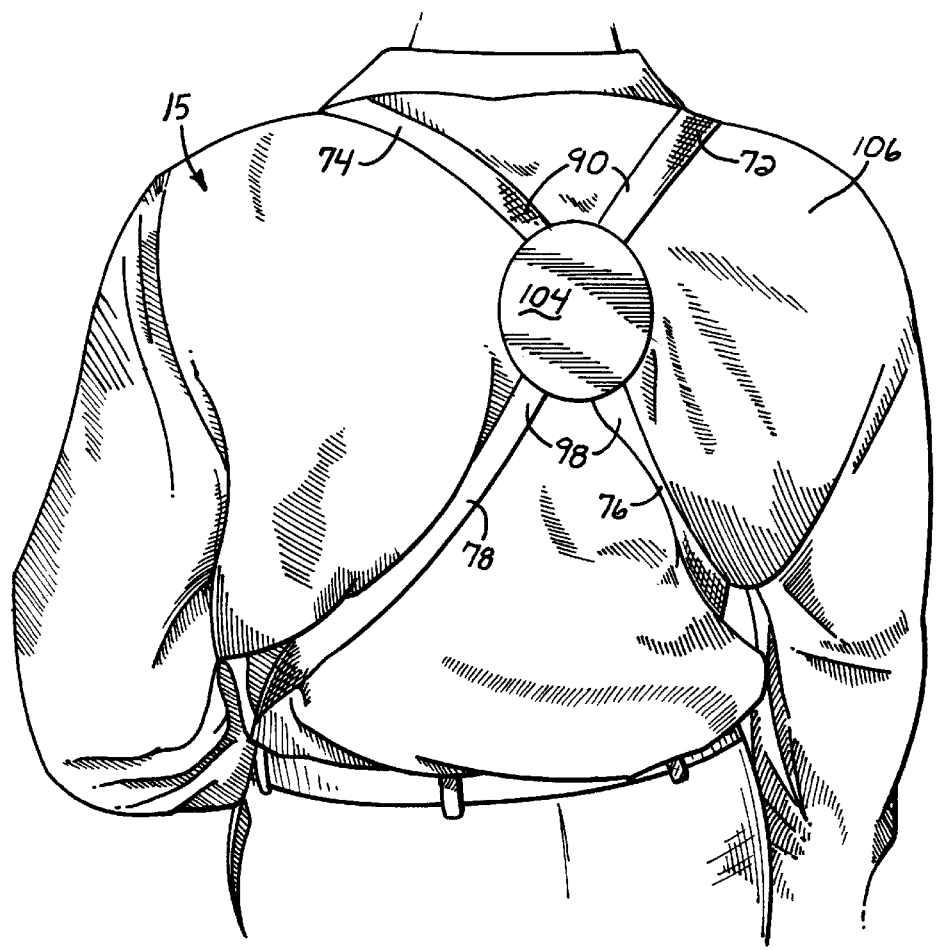
FIG. 2 is a second perspective view of the portable computer support during use.
Figure 3:
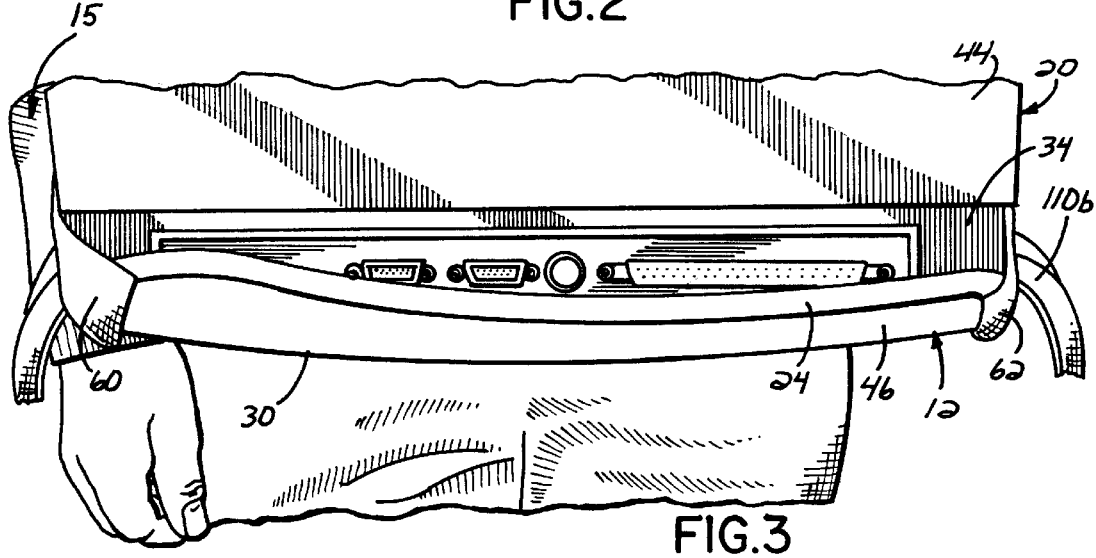
FIG. 3 is a third perspective view of the portable computer support during use.

As can be seen in FIGS. 1–5, the present inventive laptop or portable computer support 10 has a generally planar support base 12 having opposed first and second surfaces 14, 16. The first surface 14 has a non-skid texture 18 to help prevent a portable computer 20, commonly known as a laptop or notebook computer, from accidentally sliding off the first surface 14 when a user 15 places the computer 20 thereon during use, or when removing the computer 20 from the first surface 14. As used herein, "portable computer" shall include any other mobile device, including, for example, analyzers, monitors, data collectors and testing equipment.

The support base 12 has a leading edge 22 and an opposed trailing edge 24 defining a base depth D therebetween. The support base has opposed side edges 26, 28 defining a base width W. The support base 12 has an area defined by the base width W and the base depth D large enough to accommodate placement of the vast majority of portable computers 20 thereon. In addition, the dimensions of the support base 12 may be modified to accommodate computers of different sizes.

The support base 12 defines a living hinge 30 therein proximate the trailing edge 24. The living hinge 30 has a longitudinal dimension L substantially equal to the width W of the support base 12.

The portable computer 20 generally has a bottom surface 32, a rearward face 34, a forward face 36, opposed side faces 38, 40, hardware/software connections and ports 42 defined in said rearward, forward, and opposed faces 34, 36, 38, 40, and a flip-up monitor 44. As will be discussed further below, the living hinge 30 divides the support base 12 into a lip portion 46 and a carry portion 48, the lip portion 46 being biased upwardly when the computer support 10 is in use to cradle the computer rearward face 34.

The computer support 10 is provided with at least one hook and loop type fastener to variably affix the computer bottom surface 32 against the base first surface 14. In a preferred embodiment, a plurality of loop portions 52 of the fastener 50 are affixed to the first surface 14 and corresponding hook portions (not shown) are affixed to the computer bottom surface 32. The number and/or spacing of hook and loop type fasteners 50 may be varied as desired. In a preferred embodiment, at least one of the hook portion and the loop portion 52 is stitched to the first surface 14, however, any suitable method of attachment is contemplated. Further, in a preferred embodiment, at least one of the hook portion and the loop portion 52 is attached to the bottom surface 32 of the computer 20 with contact adhesive, however, any suitable method of attachment is contemplated.

Figure 4:
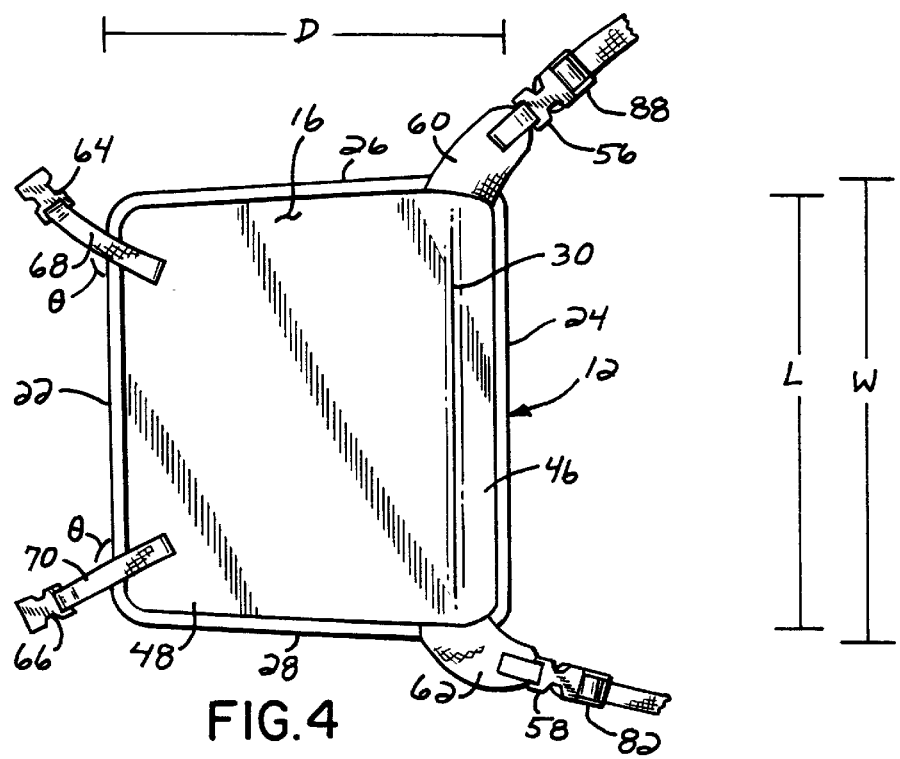
FIG. 4 is a bottom plan view of the portable computer support.
Figure 5:
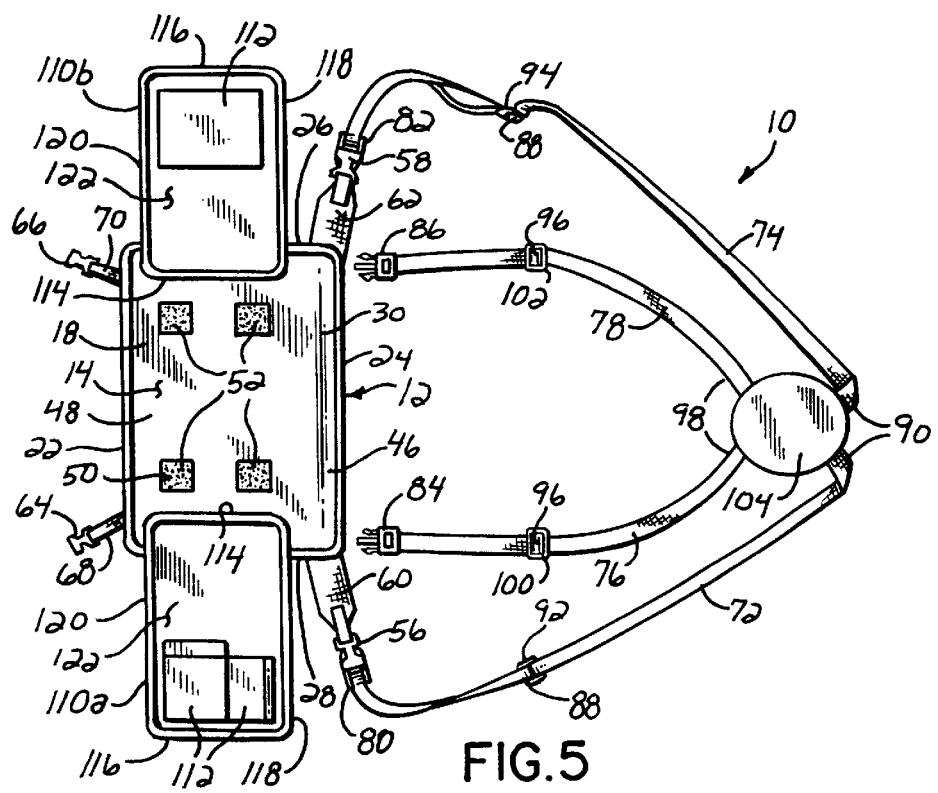
FIG. 5 is a top plan view of the portable computer support.

The computer support 10 has a pair of first female quick connect/disconnect buckle halves 56, 58 each of which are attached adjacent the opposed side edges 26, 28 and generally opposite one from the other. Each of the first female buckle halves 56, 58 is attached to its respective opposed side edge 26, 28 proximate the living hinge 30 by a respective elastic strap 60, 62 stitched to the opposed side edges 26, 28. The straps 60, 62 may be attached to the trailing edge 24 or proximate the trailing edge 24 on the side edges 26, 28 as shown in FIGS. 1 and 4. As discussed further below, when the computer support 10 is in use, the weight of the computer 20 bearing upon the support base 12 causes the elastic straps 60, 62 to stretch upwardly and, therefore, bias the lip portion 46 of the computer support 10 upwardly and function as a safeguard to prevent the computer 20 from falling from the support base 12 over the trailing edge 24, when in use.

The computer support 10 has a pair of second female quick connect/disconnect buckle halves 64, 66 attached to the second surface 16 proximate the leading edge 22. Each of the second female buckle halves 64, 66 is attached to the second surface by a respective hip strap 68, 70.

Each of the hip straps 68, 70 is stitched to the second surface 16 so that when extended an angle $\theta$ in the range of about 120 to 125° is defined between each hip strap 68, 70 and the leading edge 22.

The computer support 10 has a pair of shoulder straps 72, 74 and a pair of back straps 76, 78, each of the shoulder straps 72, 74 connected to a respective first male buckle half 80, 82 to be received in a respective first female buckle half 56, 58 and each of the back straps 76, 78 connected to a respective second male buckle half 84, 86 to be received in a respective second female buckle half 64, 66. Each shoulder strap 72, 74 has a first and a second shoulder strap end 88, 90. So that the user 15 may adjust the length of the shoulder straps 72, 74 to best fit the user's torso 93, each first shoulder strap end 88 is initially threaded through a respective sliding eyelet 92, 94. Each first shoulder strap end 88 is threaded through a respective first male buckle half 80, 82 and then secured to the eyelet 92, 94 by means known in the art.

Each of the back straps 76, 78 has a first and a second back strap end 96, 98. Each back strap 76, 78 is threaded through a respective sliding eyelet 100, 102 and second male buckle halves 84, 86, in the same manner as the shoulder straps 72, 74, described above, so that the user 15 may also adjust the back straps 76, 78.

The second shoulder strap ends 90 and second back strap ends 98 converge and are attached to a common strap junction 104 which rests over the user's back 106.

In a preferred embodiment of the present invention, the computer support 10 is provided with first and second utility flaps 110a, 110b which may be selectively attached to the first surface 14 of the base 12. The utility flaps 110a, 110b are preferably attached to the base 12 with a hook and loop type fastener (not shown) however, any other suitable attachment may be used. The utility flaps 110a, 110b are provided with pockets 112 for holding, for example, writing instruments or computer diskettes.

The utility flaps 110a, 110b have top and bottom edges 114, 116 opposed side edges 118, 120 and obverse and reverse sides 12, 124. Preferably, complementary portions of a hook and loop type fastener (not shown) are provided on the base 12 proximate opposite side edges 26, 28 and on respective utility flaps 110a, 110b proximate the top edge 114 on the reverse side 124. When the utility flaps 110a, 110b are attached to the base 12 and the computer support 10 is in use, the utility flaps 110a, 110b tend to hang from opposite side edges 26, 28 below the base 12 so that the pockets 112 open upwardly, as seen in FIG. 1.

Provided proximate the bottom edges 116 are complementary portions of a hook and loop-type fastener 126a, 126b. The hook and loop-type fastener 126a, 126b allows the user to essentially protect the computer 20 when not in use by folding the first and second utility flaps 110a, 110b over the computer 20 and securing the hook and loop-type fastener 126a, 126b together, thereby wrapping the computer 20 in a protective pocket (not shown). Also, the shoulder straps 72, 74 and the back straps 76, 78 may be folded and stored within the protective pocket.

In use, a user 15 may locate the computer 20 on the computer support first surface 14 and fix the computer 20 in place with the hook and loop type fastener 50. The user may then connect the first male buckle halves 80, 82 to respective first female buckle halves 56, 58 and drape the shoulder straps 72, 74 over the user's shoulders 108 so that the strap junction 104 rests on the user's back 106. The user 15 may then connect the second male buckle halves 84, 86 with the second female buckle halves 64, 66, respectively. Once the user 91 has connected the first and second male buckle halves 84, 86 to the first and second female buckle halves 64, 66, the user 91 may adjust the lengths of each of the shoulder straps 72, 74 and back straps 76, 78 as desired.

The user 15 may then stand with the computer 20 located on the carry portion 48. The weight of the computer 20 bearing upon the support base 12 causes the elastic straps 60, 62 to stretch, biasing the lip portion 46 upward to help cradle the computer's rearward face 34 and prevent the computer 20 from becoming dislodged and falling over the trailing edge 24. Because the computer support 10 is generally planar and the leading edge 22 and opposed side edges 26, 28 do not cover the forward face 36 and opposed side faces 38, 40, the user is free to access the hardware/software connections and ports 42 commonly located therein.

In addition, because the support base 12 has a slim profile defined by the first surface 14 and the second surface 16, the computer support 10 may be left attached to the computer 20 when the computer 20 is stored in a conventional carrying case (not shown). Despite the slim profile of support base 12, it affords a user 15 insulation from heat generated by the computer 20 when on a user's lap. The slim profile allows the user 15 to use the computer support 10 with the computer 20 attached thereto virtually anywhere, for example, the beach, in a park, or in airline seats, while the user 15 sits or stands providing the user 15 with a full and unobstructed view of the computer's flip-up monitor 44.

From the above disclosure of the detailed description of the present invention and the preceding summary of the preferred embodiments, those skilled in the art will comprehend the various modifications to which the present invention is susceptible. Therefore, we desire to be limited only by the scope of the following claims and equivalents thereof.

We claim:

1. A portable computer support adapted to receive a computer having a bottom surface, the support comprising:
   a generally planar support base having first and second opposed surfaces, opposed leading and trailing edges, and opposed side edges;
   a pair of straps, each having. respective first and second strap ends, each of said strap ends being attached to said support base at spaced locations, each strap being adapted to pass over a user's shoulders when the support is in use to support the computer;
   wherein said first strap ends are attached proximate said opposed side edges adjacent said leading and trailing edges; and
   a back junction at which said straps converge on the back of a user to support and distribute the weight of the computer on the support.

2. The portable computer support of claim 1, wherein said opposed side edges define a support base width, said support base including a living hinge generally parallel to said trailing edge and having a longitudinal dimension substantially equal to said support base width.

3. The portable computer support of claim 2, wherein said living hinge divides said base into a lip portion adapted to cradle a compute rearward face and a carry portion adapted to receive the computer bottom surface.

4. The portable computer support of claim 2, comprising an elastic strap adapted to link one of said strap ends to said support base adjacent said living hinge.

5. The portable computer support of claim 1, comprising a hook and loop-type fastener adapted to secure the computer to said first surface.

6. The portable computer support of claim 1, comprising:
   a pair of first female buckle halves joined to said opposed side edges of said base proximate said living hinge; and
   a pair of first male buckle halves, each of said pair of first male buckle halves attached to one of said straps, said first male buckle halves for cooperation with said first female buckle halves.

7. The portable computer support of claim 1, comprising:
   a pair of second female buckle halves joined to said second surface proximate said leading edge of said base; and
   a pair of second male buckle halves, said pair of second male buckle halves attached to said straps for cooperation with said second female buckle halves.

8. The portable computer support of claim 1, comprising a hip strap adapted to link one of said strap ends to said second surface of said support base adjacent said leading edge.

9. The portable computer support of claim 8, wherein said hip strap defines an angle in the range of about 120° to about 125° with respect to said leading edge.

10. The portable computer of claim 1, wherein said straps have adjustable lengths.

11. The portable computer support of claim 1, comprising a flap having obverse and reverse sides variably attached to at least one of said opposing side edges of said base.

12. The portable computer support of claim 11, wherein said flap includes a hook and loop-type fastener for cooperation with a said base to affix said flap to said base.

13. The portable computer support of claim 12, wherein said flap includes a pocket.

14. The portable computer support of claim 1, comprising a pair of flaps having a top edge and a bottom edge, said top edge of said flaps attached to said opposed side edges, said bottom edges adapted to releasably attach to one another.

15. A portable computer support adapted to receive a computer having a bottom surface, the support comprising;
   a generally planar support base having first and second opposed surfaces, opposed leading and trailing edges and opposed side edges;
   a pair of opposed first female buckle halves affixed to said second surface proximate said opposed side edges;
   a pair of second female buckle halves affixed to said second surface proximate said leading edge;
   a pair of adjustable straps, each strap having first and second strap ends;
   first and second male buckle halves attached to said straps for cooperation with said first and second female buckle halves;
   a pair of flaps with obverse and reverse sides, top and bottom edges and at least one pocket on said obverse side of at least one of said pair of flaps, said flaps including a hook and loop-type fastener adapted to affix said flaps to said base; and a back junction at which said second strap ends converge on the back of a user to support and distribute the weight of the computer on the support.

16. The portable computer support of claim 15, wherein said support base includes an integral living hinge generally parallel to said trailing edge and extending between said opposed side edges, said living hinge dividing said base into a carry portion and a lip portion, said lip portion adapted to cradle a computer rearward face.

17. The portable computer support of claim 16, comprising a pair of elastic straps connecting said first female buckle halves to said base proximate said living hinge.

18. The portable computer support of claim 15, comprising a hook and loop-type fastener for selectively attaching the computer to said base.

19. The portable computer support of claim 15, comprising a pair of hip straps affixed to said second surface and said second female buckle halves, said hip straps defining an angle in the range of about 120° to about 125° with respect to said trailing edge.

20. The portable computer support of claim 15, wherein said bottom edges are adapted to releasably attach to each other.

21. A portable computer support adapted to support a computer from a user's body to distribute weight of the computer across a user's back, the computer having a bottom surface and a rearward face, the support comprising:

a generally planar support base having first and second opposed surfaces, opposed leading and trailing edges defining a support base depth, and opposed side edges defining a support base width, wherein said support base includes an integral living hinge generally parallel to said trailing edge having longitudinal dimension substantially equal to said support base width and dividing said support base into a carry portion and a lap portion, said lip portion adapted to cradle the computer rearward face, said leading edge being locatable against the user's body;

a hook and loop-type fastener for variably adhering the bottom surface of the computer to said first surface;

a pair of first female buckle halves affixed to said base proximate said living hinge;

a pair of elastic straps connecting respective said first female buckle halves to said base proximate said living hinge;

a pair of second female buckle halves joined to said second surface proximate said leading edge;

a pair of hip straps joining said second female buckle halves to said support base, said hip straps defining an angle in the range of about 120° to 125° with respect to said leading edge;

a pair of straps having first and second shoulder strap ends, said shoulder straps having a first and second male buckle half attached thereto for cooperation with said first and second female buckle halves, respectively, wherein said straps have adjustable lengths;

a back junction at which said straps converge, said back junction overlaying a portion of the user's back to support and distribute the weight of the computer on the support; and a pair of flaps with obverse and reverse sides, top and bottom edges and at least one pocket adapted to releasably attach to said base proximate said opposed edges, said bottom edges adapted to releasably attach to each other.

* * * * *